United States Patent [19]

Bearden, Jr. et al.

[11] Patent Number: 4,579,838

[45] Date of Patent: Apr. 1, 1986

[54] CATALYSTS AND HYDROCONVERSION PROCESSES UTILIZING THE SAME

[75] Inventors: Roby Bearden, Jr.; Clyde L. Aldridge, both of Baton Rouge, La.

[73] Assignee: Exxon Research and Engineering Co., Florham Park, N.J.

[21] Appl. No.: 728,082

[22] Filed: Apr. 29, 1985

[51] Int. Cl.$^4$ .......................................... B01J 27/047
[52] U.S. Cl. .................................. 502/219; 502/150; 502/168; 502/172; 502/319; 208/108; 208/112; 208/216 R
[58] Field of Search ............... 502/150, 151, 152, 171, 502/156, 219, 172, 305, 319, 168; 208/216 R, 108, 112

[56] References Cited

U.S. PATENT DOCUMENTS

| | | | |
|---|---|---|---|
| 3,265,615 | 8/1966 | Buss | 502/219 |
| 3,607,851 | 9/1971 | Forman | 502/156 |
| 3,715,321 | 2/1973 | Horvath | 502/219 |
| 4,077,867 | 3/1978 | Aldridge et al. | 208/10 |
| 4,096,093 | 6/1978 | Hwang | 502/319 |
| 4,134,825 | 1/1979 | Bearden, Jr. et al. | 208/112 |
| 4,192,735 | 3/1980 | Aldridge et al. | 502/219 |
| 4,226,742 | 10/1980 | Bearden, Jr. et al. | 252/431 |
| 4,244,839 | 1/1981 | Aldridge et al. | 252/431 |
| 4,285,803 | 8/1981 | Braun et al. | 208/112 |
| 4,307,214 | 12/1981 | McDaniel et al. | 502/219 |
| 4,357,229 | 11/1982 | Bearden, Jr. et al. | 208/112 |
| 4,368,301 | 1/1983 | Hawley et al. | 502/172 |
| 4,424,110 | 1/1984 | Bearden, Jr. et al. | 208/108 |

*Primary Examiner*—John Doll
*Assistant Examiner*—Anthony McFarlane
*Attorney, Agent, or Firm*—Marthe L. Gibbons

[57] ABSTRACT

A catalyst is prepared by heating the reaction product of $CrO_3$ and tert-butyl alcohol as catalyst precursor in a hydrocarbon medium in the presence of hydrogen sulfide to convert the catalyst precursor to a solid chromium-containing catalyst. Hydroconversion processes utilizing the catalyst to convert oil, coal, and mixtures thereof are also provided.

10 Claims, 1 Drawing Figure

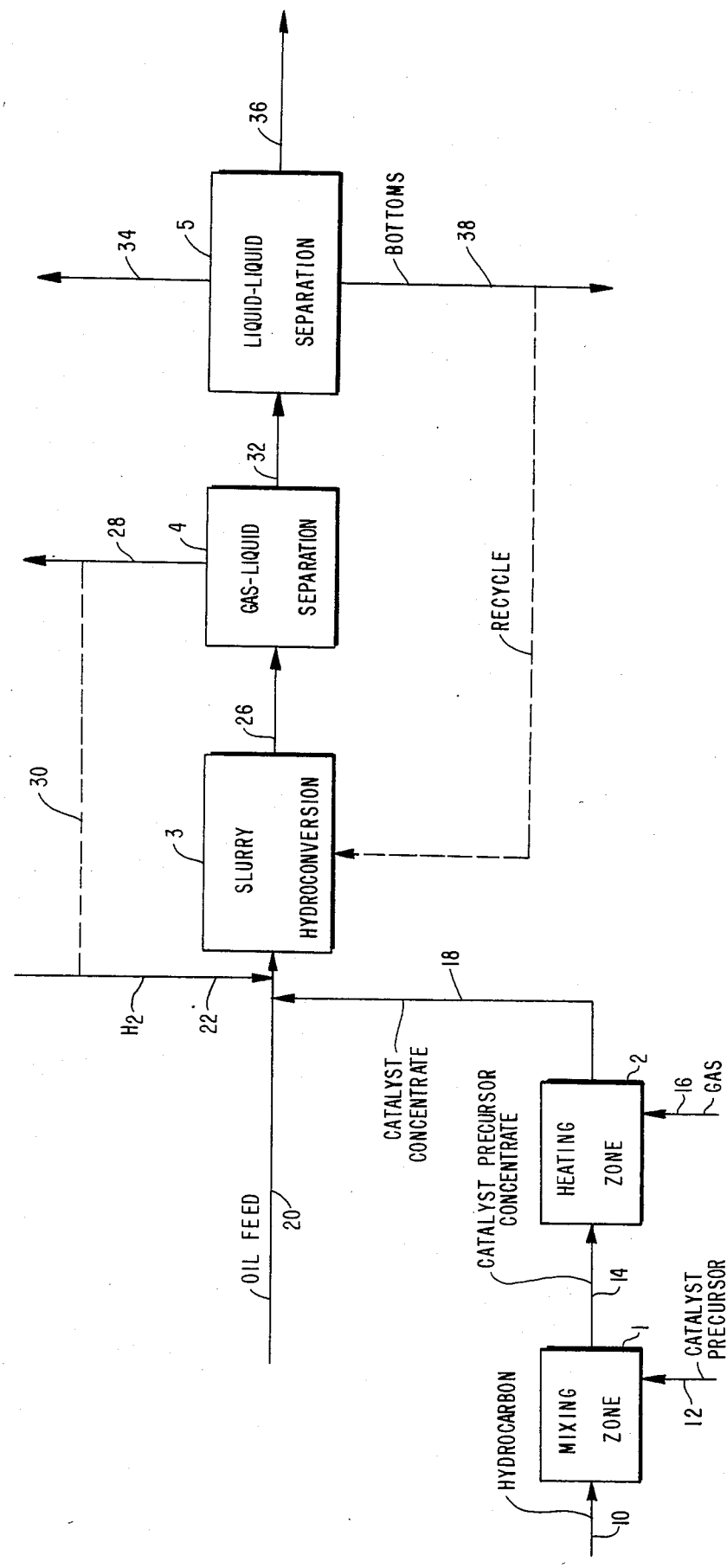

CATALYSTS AND HYDROCONVERSION PROCESSES UTILIZING THE SAME

BACKGROUND OF THE INVENTION

1. Field of the Invention

This invention relates to catalysts characterized by their method of preparation and to their use in processes for hydroconverting carbonaceous materials such as hydrocarbonaceous oils and coal.

2. Description of Information Disclosures

Slurry hydroconversion processes utilizing a catalyst prepared in a hydrocarbon oil from a thermally decomposable or oil soluble metal compound catalyst precursor including chromium compounds are known. See, for example, U.S. Pat. Nos. 4,226,742 and 4,244,839.

It is also known to use such catalysts in hydroconversion processes (i.e., coal liquefaction) in which coal particles are slurried in a hydrocarbonaceous material. See, for example, U.S. Pat. No. 4,077,867.

The term "hydroconversion" with reference to a hydrocarbonaceous oil is used herein to designate a catalytic process conducted in the presence of hydrogen in which at least a portion of the heavy constituents of the oil is converted to lower boiling hydrocarbon products while it may simultaneously reduce the concentration of nitrogenous compounds, sulfur compounds and metallic constituents.

The term "hydroconversion" with reference to coal is used herein to designate a catalytic process conducted in the presence of hydrogen wherein coal is converted to normally liquid hydrocarbon products.

All boiling points referred to herein are atmospheric pressure equivalents boiling points unless otherwise specified.

It has now been found that the reaction product of chromic acid (CrO3) and tertiary butyl alcohol can be used as catalyst precursor and that novel catalysts can be prepared by converting the chromate reaction product in a hydrocarbon medium at certain conditions to form solid chromium-containing catalysts.

SUMMARY OF THE INVENTION

In accordance with the invention, there is provided a catalyst prepared by the steps which comprise:

(a) forming a mixture of a hydrocarbon material and the reaction product of CrO3 and tert-butyl alcohol, and (b) heating the resulting mixture in the presence of a hydrogen sulfide-containing gas at conditions to produce a slurry comprising said hydrocarbon material and a solid chromium-containing catalyst.

In accordance with the invention, there is also provided a hydroconversion process utilizing the above given catalyst.

BRIEF DESCRIPTION OF THE DRAWING

The FIGURE is a schematic flow plan of one embodiment of the invention.

DETAILED DESCRIPTION OF THE INVENTION

The catalyst of the present invention is prepared by forming a mixture of a hydrocarbonaceous material and the reaction product of CrO3 and tert-butyl alcohol and heating the resulting mixture in the presence of a hydrogen sulfide-containing gas at conditions to convert the reaction product to the corresponding solid chromium-containing catalyst dispersed in the hydrocarbonaceous material in which it was prepared. The reaction product of CrO3 and tertiary butyl alcohol hereinafter designated "the chromate reaction product" is oil soluble and liquid at standard conditions. The chromate reaction product may be synthesized by reacting chromic acid (CrO3) with tertiary butyl alcohol (i.e., 2-methyl-2-propanol), as shown in Equation (A), at ambient temperature. The reaction product may comprise the mono-tert-butyl chromate and the di-tert-butyl chromate, as shown in Equation (A), with the di-tert butyl chromate formation favored at tert-butyl alcohol to CrO3 mole ratios of 2.0 and higher, as disclosed in *Oxidation in Organic Chemistry*, Part A, edited by K. B. Wiberg, Academic Press, New York; p. 70, 1965. The ratio of moles of tert-butyl alcohol to CrO3 used as reactants may range from 0.5 to 30.0, preferably from 1.0 to 15.0, and more preferably from 2.0 to 10.0. Isolation and purification of the chromate esters in the reaction product is not required for use in the preparation of the catalyst of the present invention.

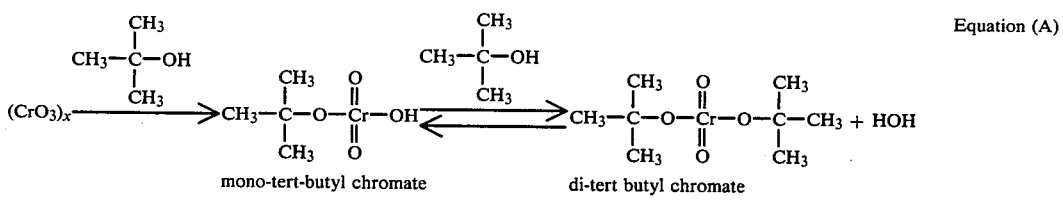

Equation (A)

The hydrocarbonaceous materials to which the chromate reaction product is added to form the mixture include hydrocarbons boiling above about 350° F., preferably, hydrocarbonaceous oils comprising constituents boiling above 1050° F., more preferably having at least 10 wt.% constituents boiling above 1050° F., such as crude oils, atmospheric residua boiling above 650° F. and vacuum residua boiling above 1050° F. Preferably, the hydrocarbonaceous oil has an initial boiling point above at least 650° F. The hydrocarbonaceous material may be derived from any source, such as petroleum, shale oil, tar sand oil, products derived from coal liquefaction processes and mixtures thereof. A hydrocarbon sulfide-containing gas is introduced into the mixture of hydrocarbon and chromate reaction product. The hydrogen sulfide-containing gas may comprise from about 1 to about 100 mole percent hydrogen sulfide. Preferably, the gas comprises hydrogen and from about 1 to 90 mole % hydrogen sulfide, based on the total gas. The mixture of hydrocarbon and chromate reaction product is treated in the presence of the hydrogen sulfide-containing gas at a temperature of at least 500° F., preferably at a temperature ranging from about 650° to 1000° F., more preferably at a temperature ranging from about 700° to about 800° F. and a total pressure ranging from about 50 to about 5000 psig, preferably a pressure ranging from about 100 to about 2000 psig to convert the chromate reaction product to a solid chromium-containing catalyst dispersed in the hydrocarbon medium in which it is being prepared. The hydrocarbon medium may be the hydrocarbons present in the carbonaceous chargestock of a hydroconversion process. For example, when a hydrocarbonaceous oil is to be hydroconverted, the solid chromium-containing catalyst may be prepared in the hydrocarbonaceous oil that will be used as chargestock for the hydroconversion process. In coal liquefaction processes, wherein the carbonaceous chargestock comprises coal and a hydrocarbon diluent, the chromate reaction product may be added to the hydrocarbon diluent and converted therein to the solid catalyst, preferably prior to introducing the coal in the diluent. As a first alternative, the catalyst precursor may be added to the hydrocarbon that is of the same type as the one that will be used as chargestock for the hydroconversion process of the catalyst precursor may be added to a hydrocarbon medium that is different from the hydrocarbon that will be present in the carbonaceous chargestock of the hydroconversion process. The catalyst precursor in the hydrocarbon medium may be added to the carbonaceous chargestock of a hydroconversion process. As a second alternative, the solid catalyst may be preformed in a hydrocarbon that is of the same type as the one that will be used as chargestock for a hydroconversion process or in a different hydrocarbon medium than the one that will be in the chargestock of the hydroconversion process and the catalyst precursor may be converted to a solid catalyst in the hydrocarbon medium. At least a portion of the mixture of preformed catalyst dispersed in the hydrocarbon medium may be used as such as catalyst concentrate or, if desired, the solid catalyst may be separated from the hydrocarbon medium and the recovered solid catalyst may be used as catalyst. The chromate reaction product is suitably added to the hydrocarbon medium in an amount ranging from about 0.001 to 2 wt. %, calculated as elemental chromium, based on the hydrocarbon medium. When a catalyst precursor concentrate or a catalyst concentrate is prepared (rather than introducing the catalyst precursor into the chargestock), then preferably the amount of catalyst precursor, i.e., chromate reaction product, introduced into the hydrocarbon medium ranges suitably from about 0.05 to 2 wt.%, preferably from 0.1 to 2 wt.%, calculated as elemental chromium, based on the hydrocarbon medium. The separated solid catalyst or the solid catalyst dispersed in the hydrocarbon medium is suitable for use in processes for the hydroconversion of hydrocarbonaceous oils, hydroconversion of coal (i.e., coal liquefaction) and the simultaneous hydroconversion of coal and hydrocarbonaceous oils.

Suitable hydroconversion operating conditions for converting a hydrocarbonaceous oil to lower boiling products are summarized in Table I.

TABLE I

| Conditions | Broad Range | Preferred Range |
|---|---|---|
| Temp., °F. | 600–1000 | 800–900 |
| H$_2$ Partial Pressure, psig | 50–5000 | 300–2000 |

Suitable hydroconversion conditions for coal liquefaction in which the chargestock comprises coal in a hydrocarbon diluent as summarized in Table II.

TABLE II

| Conditions | Broad Range | Preferred Range |
|---|---|---|
| Temp., °F. | 500–900 | 750–860 |
| Total Pressure, psig | 500–7000 | 1150–2500 |
| H$_2$ Partial Pressure, psig | 400–5000 | 1000–1600 |

Suitable carbonaceous chargestocks for the hydroconversion processes utilizing the catalyst of the present invention include hydrocarbonaceous oils, coal and mixtures thereof. Suitable hydrocarbonaceous oil chargestocks include mineral oils; mixtures of hydrocarbons boiling above 430° F., preferably above 650° F.; whole or topped petroleum crude oils; including heavy crude oils; asphaltenes; residual oils such as atmospheric residua boiling above about 650° F.; petroleum vacuum residua boiling above 1050° F.; once through coker bottoms; tars; bitumen; tar sand oils; shale oils; hydrocarbonaceous oils derived from coal liquefaction processes, including coal liquefaction bottoms and mixtures thereof; coal, coal slurries and mixtures thereof. The term "coal" is used herein to designate normally solid carbonaceous material including all ranks of coal, such as anthracite coal, bituminous coal, semi-bituminous coal, sub-bituminous coal, lignite, peat and mixtures thereof.

DESCRIPTION OF THE PREFERRED EMBODIMENT

Referring to the FIGURE, a heavy hydrocarbonaceous oil is introduced by line 10 into mixing zone 1. Suitable heavy hydrocarbonaceous oils for introduction into zone 1, include hydrocarbonaceous oils comprising constituents boiling above 1050° F., preferably having at least 10 wt. % constituents boiling above 1050° F., such as crude oils, atmospheric residua boiling above 650° F., vacuum residua boiling above 1050° F. Preferably, the hydrocarbonaceous oil has an initial boiling point above at least 650° F. and comprises asphaltenes. Most preferably, the hydrocarbonaceous oil is a blend of at least two hydrocarbonaceous oils, namely, a lighter boiling oil having a boiling point below about 975° F. and a heavier oil having a boiling point above 975° F. and a blend comprising at least about 10 wt. %, preferably at least about 25 wt. % materials boiling above 1050° F. Preferred concentrations of the heavier oil in the blend include from about 25 to 90 wt.% heavier oil, preferably 45 to 90 wt. % heavier oil, most preferably from 45 to 75 wt. % heavier oil, based on the weight of the blend (mixture of oils). The light oil may be a gas oil and the heavy oil may be a vacuum residuum. Alternatively, an atmospheric residuum having the appropriate amount of desired constituents may be used as the oil of line 10. The hydrocarbonaceous oil carried in line 10 may be derived from any source, such as petroleum, tar sand oil, shale oil, liquids derived from coal liquefaction processes and mixtures of any of these oils. Generally these oils have a Conradson carbon content ranging from about 5 to 50 wt. % (as to Conradson carbon content, see ASTM Test D-189-65). The reaction product of CrO$_3$ and tert-butyl alcohol (catalyst precursor) is introduced into mixing zone 1 by line 12.

A sufficient amount of the chromate reaction product (catalyst precursor) is introduced into mixing zone 1 to form a catalyst precursor concentrate, that is, a mixture comprising from about 0.05 to 2, preferably from 0.1 to 1, more preferably from about 0.2 to 1 wt.% chromium, calculated as elemental metal, based on the hydrocarbonaceous oil in the mixture. The resulting catalyst precursor concentrate is passed by line 14 into heating zone 2.

A gas is introduced into heating zone 2 by line 16. The gas is a hydrogen sulfide-containing gas comprising from about 1 to 100 mole % hydrogen sulfide. Preferably the hydrogen sulfide-containing gas also comprises hydrogen. More preferably, the hydrogen sulfide-containing gas comprises hydrogen and from about 1 to about 90 mole percent hydrogen sulfide based on the total gas. The mixture of chromate reaction product and hydrocarbonaceous oil (catalyst precursor concentrate) is heated in zone 2 to a temperature sufficient to convert the oil soluble chromate reaction product (catalyst precursor) to the corresponding chromium-containing solid catalyst. Suitable catalyst preparation conditions include a temperature of at least about 500° F., preferably a temperature ranging from 650° to 1000° F., more preferably a temperature ranging from about 700° to 800° F. and a total pressure ranging from about 50 to about 5000 psig, preferably a pressure ranging from about 100 to about 2000 psig, to convert the chromate reaction product to a solid chromium-containing catalyst. The resulting catalyst concentrate (solid chromium-containing catalyst particles dispersed in the hydrocarbon oil) is removed by line 18 from zone 2. At least a portion of the catalyst concentrate is introduced into line 20 which carries a hydrocarbonaceous oil chargestock. The catalyst concentrate disperses in the oil chargestock. Suitable hydrocarbonaceous chargestocks include crude oils, mixtures of hydrocarbons boiling above 430° F., preferably above 650° F., for example, gas oils, vacuum residua, atmospheric residua, once through coker bottoms, and mixtures thereof. The hydrocarbonaceous oil may be derived from any source, such as petroleum, shale oil, tar sand oil, oils derived from coal liquefaction processes, including coal liquefaction bottoms, and mixtures thereof. Preferably, the hydrocarbonaceous oils have at least 10 wt. % materials boiling above 1050° F., more preferably, the hydrocarbonaceous oils have a Conradson carbon content ranging from about 5 to about 50 wt. %.

A hydrogen-containing gas is introduced by line 22 into line 20. The mixture of hydrocarbonaceous chargestock, catalyst concentrate and hydrogen is passed by line 20 into slurry hydroconversion zone 3. The catalyst concentrate of line 18 is added to the hydrocarbonaceous chargestock in an amount sufficient to provide from about 10 to about 2000 wppm chromium, preferably from about 50 to about 1000 wppm chromium, calculated as elemental metal, based on the total hydroconversion zone chargestock, i.e., concentrate plus hydrocarbonaceous chargestock.

Suitable slurry hydroconversion operating conditions are those summarized in Table I.

The hydroconversion zone effluent is removed by line 26 and passed to a gas-liquid separation zone 4 wherein the normally gaseous phase is separated from a normally liquid phase. The gaseous phase is removed from separation zone 4 by line 28. Alternatively, the gaseous phase, which comprises hydrogen, may be recycled by line 30, preferably after removal of undesired constituents, to slurry hydroconversion zone 3 via line 22. The normally liquid phase, which comprises catalytic solids and a hydroconverted, hydrocarbonaceous oil product, is passed by line 32 to separation zone 5 for fractionation by conventional means, such as distillation into various fractions, such as light, medium boiling and heavy bottoms fractions. The light fraction is removed by line 34. The medium fraction is removed by line 36. The heavy bottoms fraction is removed by line 38 and, if desired, at least a portion of the bottoms fraction may be recycled to hydroconversion zone 3.

The following examples are presented to illustrate the invention:

EXAMPLE 1

Preparation of Chromium Catalyst Precursor Concentrate

A chromate ester product was prepared by mixing 0.39 g (0.0039 mole) of crystalline $CrO_3$ with 1.61 g (0.022 mole) of tert-butyl alcohol at room temperature. The resulting reaction product is the "chromate reaction product" used in the present invention as catalyst precursor.

A charge of 1.8 g of this chromate reaction product was added to a 300 ml Autoclave Engineers stirred autoclave at room temperature along with 90 g of a heavy Arabian atmospheric residuum, which had an initial boiling point of about 650° F. and contained 48 wt.% of material boiling above 1050° F. The autoclave was then sealed and heated with stirring from room temperature up to 104° F. for a stirred contact period of 15 minutes duration. Upon completion of this step, the autoclave was cooled and the resultant chromium catalyst precursor concentrate (0.20 wt.% Cr) was discharged and stored under nitrogen.

EXAMPLE 2

Preparation of Chromium Catalyst Precursor Concentrate with Toluene Diluted Chromate Reaction Product A chromate reaction product was prepared by mixing 0.39 g (0.0039 mole) of crystalline $CrO_3$ with 1.61 g (0.022 mole) of tert-butyl alcohol at room temperature and was subsequently diluted with 2.0 g of toluene.

A catalyst precursor concentrate was then prepared according to the procedure of Example 1 by adding 3.6 g of the toluene diluted chromate ester reaction product to 90 g of heavy Arabian atmospheric residuum. The resultant precursor concentrate contained 0.20 wt.% Cr.

EXAMPLE 3

Preparation of Chromium Catalyst Precursor Concentrate with Heptane Diluted Chromate Reaction Product A chromate reaction product was prepared by mixing 0.39 g (0.0039 mole) of crystalline $CrO_3$ with 1.61 g (0.022 mole) of tert-butyl alcohol at room temperature and was subsequently diluted with 2.0 g of n-heptane.

A catalyst precursor concentrate was then prepared according to the procedure of Example 1 by mixing 3.60 g of the heptane diluted chromate reaction product with 90.0 g of heavy Arabian atmospheric residuum. The resultant precursor concentrate contained 0.20 wt.% Cr.

EXAMPLE 4

(Comparative) Preparation of Catalyst Precursor Concentrate Using Chromium Naphthenate At room temperature, a 300 ml Autoclave Engineers stirred autoclave was charged with 5.0 g of chromium naphthenate (a liquid material containing 4.0 wt.% chromium) and 95.0 g of a heavy Arabian atmospheric residuum that had an initial boiling point of about 650° F. and which contained 48 wt.% of material with boiling point above 1050° F.

The autoclave was sealed and then heated from room temperature to 104° F. with stirring and maintained at 104° F. for a period of 15 minutes, whereupon the autoclave was cooled and the resultant precursor concentrate (0.20 wt.% Cr) was discharged and stored under nitrogen.

EXAMPLE 5

Preparation of Chromium Catalyst Precursor Concentrate with Recovery of Excess Alcohol A chromate reaction product was prepared by mixing 0.5 g (0.005 mole) of crystalline $CrO_3$ with 4.5 g (0.0608 mole) of tert-butyl alcohol at room temperature.

A 300 cc Autoclave Engineers stirred autoclave was charged with 96.15 g of the heavy Arabian atmospheric residuum described in Example 1, flushed with nitrogen and then heated with stirring from room temperature to 104° F., at which point 3.80 g of the chromate reaction product was injected, all at once, into the stirred residuum. After an additional 10 minute period of stirring at 104° F., the autoclave was heated to 302° F. and maintained at this temperature with stirring and with a flow of nitrogen through the autoclave to remove excess t-butyl alcohol as well as the water formed from the reaction of $CrO_3$ with tert-butyl alcohol. Upon cooling, the resultant chromium precursor concentrate, which contained 0.20 wt.% chromium, was discharged and stored under nitrogen.

EXAMPLE 6

Preparation of Preformed Chromium Catalyst Concentrate

A chromate reaction product was prepared by mixing 0.39 g (0.0039 mole) of crystalline $CrO_3$ with 1.68 g (0.022 mole) of t-butyl alcohol at room temperature.

Next, 1.0 g of the chromate reaction product was added to a 300 ml Autoclave Engineers stirred autoclave along with 90.0 g of a heavy Arabian atmospheric residuum, which residuum had an initial boiling point of 650° F. and contained 48 wt.% of material boiling above 1050° F. The autoclave was sealed and heated from room temperature to 104° F. with stirring and maintained at 104° F. for 15 minutes with stirring, whereupon the autoclave was cooled to room temperature (74° F.).

The autoclave was then flushed with hydrogen, charged with 150 psia of $H_2S$ and 1250 psia $H_2$ and heated with stirring from room temperature to 725° F. for a stirred contact of 30 minutes duration. Upon cooling to room temperature and removing gases, the resultant concentrate of preformed chromium catalyst, which concentrate contained 0.20 wt.% chromium, was discharged and stored with a nitrogen blanket.

EXAMPLE 7

Hydroconversion Experiments Comparing Catalyst Precursors of Examples 1 and 4

This example illustrates that the catalyst precursor concentrate prepared using a chromate reaction product of the present invention (Example 1) is superior to that obtained using chromium naphthenate (Example 4) which is not a precursor of the present invention but is a precursor of the type disclosed in U.S. Pat. No. 4,226,742.

The hydroconversion test that was used to compare the relative effectiveness of these precursor concentrates (as well as for the concentrate preparations described in Examples 2, 3, 5 and 6) was carried out in the following manner.

A 300 ml Autoclave Engineers stirred autoclave was charged at room temperature with 21.0 g of the catalyst precursor concentrate, an amount that furnished 350 wppm Cr on the total autoclave charge of hydrocarbonaceous materials which comprised the precursor concentrate and 99 g of a heavy Arabian vacuum residuum. The vacuum residuum feed contained 88.6 wt.% of material boiling above 975° F. and 21.1 wt.% of Conradson carbon components.

After charging the catalyst precursor concentrate and residuum feed, the autoclave was flushed with nitrogen and heated with stirring from room temperature to 158° F. for a 15 minute stirred contact.

The autoclave was then cooled to room temperature, flushed with hydrogen, charged with 50 psia $H_2S$ and 1365 psia $H_2$, and then heated with stirring from room temperature up to 725° F. for a stirred contact period of 20 minutes.

Upon completion of the 20 minute contact, a flow of $H_2$ was started through the autoclave and the autoclave was heated to the hydroconversion reaction temperature of 830° F. where it was held with stirring for a period of 180 minutes. Autoclave pressure during this reaction period was 2100 psig and the gas flow (measured at the reactor outlet at room temperature and atmospheric pressure) was 0.36 liters/minute.

The autoclave was then cooled, gaseous products were removed and collected for composition analysis by mass spectrometry. Liquid and solid products remaining in the reactor were removed by washing with toluene and the toluene wash then filtered to recover toluene insoluble solids. The solids were subsequently vacuum oven dried and analyzed to determine the fraction of carbon contained. Coke yield is based on the carbon fraction recovered and is calculated as shown in Equation (1).

The toluene filtrate that contained oil products was stripped to remove toluene and vacuum distilled to determine the amount of unconverted 975+° F. material, which value was used to calculate the conversion of 975+° F. feed as shown in Equation (2). In the conversion calculation of Equation (2), coke is included as unconverted feed.

Unconverted Conradson carbon was determined by assaying 975+° F. distillation residue was Conradson carbon content (see ASTM test D-189-65) and conversioin was calculated as shown in Equation (3).

The following results were obtained when hydroconversion experiments were carried out with the precursor concentrates of Examples 1 and 4.

$$\text{Coke Yield, \%} = \frac{\text{g. toluene insoluble solids} \times \text{wt. fraction carbon}}{\text{g. vacuum residuum} \times 0.85*} \times 100 \quad \text{Equation (1)}$$

$$975+ \text{°F. Conv., \%} = \frac{\text{g. }975+ \text{°F. feed} - (\text{g. }975+ \text{°F. distillation residue} + \text{g. coke})}{\text{g. }975+ \text{°F. feed}} \times 100 \qquad \text{Equation (2)}$$

$$\text{Con. Carbon Conv., \%} = \frac{\text{g. Con. Carbon charged} - \text{g. Con. Carbon recovered}}{\text{g. Con. Carbon charged}} \times 100 \qquad \text{Equation (3)}$$

*This is an empirical factor for converting grams carbon to grams coke.

TABLE I

| Hydroconversion Experiment No. | R-1663 | R-1714 |
|---|---|---|
| Precursor concentrate of: | Example 1 | Example 4 |
| Chromium precursor used in concentrate | Chromate reaction product | Chromium naphthenate |
| Coke yield, % on vacuum resid | 1.43 | 5.00 |
| 975 + °F. conv., % | 84.6 | 80.4 |
| Conradson carbon conv., % | 65.2 | 58.1 |

EXAMPLE 8

Hydroconversion Experiments Comparing Catalyst Precursor Concentrates of Examples 1, 2 and 3

The precursor concentrates of Examples 1, 2 and 3 were compared in hydroconversion experiments that were carried out according to the procedure described in Example 7. The results show that the chromate reaction product can be diluted with hydrocarbon, if desired, prior to forming the catalyst precursor concentrate and that such dilution does not significantly alter the effectiveness of the resultant precursor concentrates.

TABLE II

| Hydroconversion Experiment No. | R-1663 | R-1667 | R-1672 |
|---|---|---|---|
| Precursor concentrate of: | Example 1 | Example 2 | Example 3 |
| Precursor used in concentrate preparation | Chromate reaction product | Chromate reaction product diluted with toluene | Chromate reaction product diluted with heptane |
| Coke yield, % on vacuum resid | 1.43 | 1.52 | 1.60 |
| 975 + °F. conv., % | 84.6 | 84.1 | 84.8 |

EXAMPLE 9

Hydroconversion Experiments Comparing Precursor Concentrates of Example 1 and Example 5

The results of hydroconversion experiments carried out according to the procedure given in Example 7 show that a precursor concentrate prepared with chromate reaction product contained in a substantial excess amount of t-butyl alcohol, with subsequent recovery of excess alcohol (concentrate of Example 5) gives a concentrate that is essentially equivalent to that obtained using a chromate reaction product prepared with lesser amounts of t-butyl alcohol (Example 1).

TABLE III

| Hydroconversion Experiment No. | R-1663 | R-1711 |
|---|---|---|
| Precursor concentrate of: | Example 1 | Example 5 |
| Ratio of moles of alcohol to CrO3 used to form chromate reaction product | 5.64 | 12.16 |
| Coke yield, wt. % on vacuum resid | 1.43 | 1.54 |
| 975 + °F. conversion, % | 84.6 | 84.2 |

EXAMPLE 10

Hydroconversion Experiments Comparing Precursor Concentrate of Example 1 With Preformed Catalyst Concentrate of Example 6

The results of hydroconversion experiments carried out according to the procedure given in Example 7 show that the preformed (sulfided) catalyst concentrate of Example 6 gives a small improvement in hydroconversion performance over that obtained using the catalyst precursor concentrate of Example 1.

TABLE IV

| Hydroconversion Experiment # | R-1663 | R-1681 |
|---|---|---|
| Precursor concentrate activated with H2/H2S prior to hydroconversion test | No (Example 1) | Yes (Example 6) |
| Coke yield, wt. % on vacuum resid | 1.43 | 1.33 |
| 975 + °F. conversion, % | 84.6 | 85.3 |

EXAMPLE 11

Hydroconversion Experiments Comparing Precursor Concentrate of Example 1 With Preformed Catalyst Concentrate of Example 6 (Cold Lake Feed)

Hydroconversion experiments were carried out according to the procedure given in Example 7 except that the heavy Arabian vacuum residuum feed was replaced with a Cold Lake heavy crude that had an initial boiling point of 850° F. and contained 70 wt.% of material boiling above 975° F.

With this Cold Lake heavy crude, it was found that the preformed catalyst concentrate (Example 6) gave substantially better performance than obtained using the catalyst precursor concentrate (Example 1). Results are compared in Table V.

TABLE V

| (Topped Cold Lake crude feed)* | | |
|---|---|---|
| Hydroconversion Experiment # | R-1665 | R-1682 |
| Chromium added as: | Precursor concentrate (Example 1) | Preformed catalyst concentrate (Example 6) |
| Cr on total feed, wppm | 250 | 250 |
| Coke yield, % on total feed | 4.18 | 1.34 |
| 975 + °F. conversion, % | 83.4 | 87.2 |

*Initial boiling point 850° F., 975 + °F. content of 70 wt. %

What is claimed is:

1. A catalyst prepared by the steps which comprise:
   (a) forming a mixture of a hydrocarbon material and the reaction product of $CrO_3$ and tert-butyl alcohol, said reaction product having been obtained by reacting tert-butyl alcohol with $CrO_3$ at ambient temperature, and
   (b) heating the resulting mixture in the presence of a hydrogen sulfide-containing gas at conditions, including a temperature of at least about 500° F. and a total pressure ranging from about 50 to 5000 psig, to produce a slurry comprising said hydrocarbon material and a solid chromium-containing catalyst.

2. The catalyst of claim 1 wherein said conditions of step (b) include a temperature of at least about 500° F.

3. The catalyst of claim 1 wherein said hydrogen sulfide-containing gas also comprises hydrogen.

4. The catalyst of claim 1 wherein said hydrocarbon material comprises constituents boiling above 1050° F.

5. The catalyst of claim 1 wherein said reaction product is present in said mixture of step (a) in an amount ranging from about 0.001 to 2 weight percent, calculated as elemental chromium, based on said hydrocarbon material.

6. The catalyst of claim 1 wherein said reaction product is present in said mixture of step (a) in an amount ranging from about 0.05 to 2 weight percent, said mixture being a catalyst precursor concentrate.

7. The catalyst of claim 6 wherein said resulting mixture of step (b) is said catalyst precursor concentrate and wherein said slurry is a catalyst concentrate.

8. The catalyst of claim 1 wherein said solid chromium-containing catalyst is recovered from said slurry.

9. The catalyst of claim 1 wherein said hydrogen sulfide-containing gas comprises from 1 to 100 mole percent.

10. The catalyst of claim 1 wherein said tert-butyl alcohol is reacted with $CrO_3$ at a mole ratio of tert-butyl alcohol to $CrO_3$ ranging from 0.5 to 30.0 to produce said reaction product.

* * * * *